(12) United States Patent
Yeh et al.

(10) Patent No.: US 11,777,552 B2
(45) Date of Patent: Oct. 3, 2023

(54) METHOD FOR TRANSCEIVING SIGNALS AND TRANSCEIVER USING THE SAME

(71) Applicant: Leltek Inc., New Taipei (TW)

(72) Inventors: Biyun Yeh, New Taipei (TW); Sheng-Chang Peng, Taipei (TW); Kuo-Ping Liu, Taipei (TW)

(73) Assignee: Leltek Inc., New Taipei (TW)

( * ) Notice: Subject to any disclaimer, the term of this patent is extended or adjusted under 35 U.S.C. 154(b) by 589 days.

(21) Appl. No.: 17/076,814

(22) Filed: Oct. 22, 2020

(65) Prior Publication Data
US 2021/0044317 A1  Feb. 11, 2021

Related U.S. Application Data

(63) Continuation-in-part of application No. 15/347,798, filed on Nov. 10, 2016, now Pat. No. 11,090,030.

(51) Int. Cl.
*H04B 1/44* (2006.01)
*G10K 11/34* (2006.01)

(52) U.S. Cl.
CPC .............. *H04B 1/44* (2013.01); *G10K 11/345* (2013.01)

(58) Field of Classification Search
CPC ................................ H04B 1/44; G01K 11/345
See application file for complete search history.

(56) References Cited

U.S. PATENT DOCUMENTS

| | | | | |
|---|---|---|---|---|
| 4,159,462 | A * | 6/1979 | Rocha | G01S 15/8927 367/87 |
| 4,663,973 | A * | 5/1987 | Iida | G10K 11/346 73/609 |
| 11,090,030 | B2 * | 8/2021 | Liu | G01S 15/89 |
| 2018/0125454 | A1 * | 5/2018 | Liu | G01S 15/8915 |
| 2018/0156904 | A1 * | 6/2018 | Owen | B06B 1/0215 |
| 2018/0161011 | A1 * | 6/2018 | Owen | G01S 7/52022 |
| 2018/0169444 | A1 * | 6/2018 | Averkiou | A61B 8/085 |
| 2020/0401938 | A1 * | 12/2020 | Etkin | G16H 50/30 |
| 2021/0093299 | A1 * | 4/2021 | Heid | A61B 8/4494 |

* cited by examiner

*Primary Examiner* — Hai V Nguyen
(74) *Attorney, Agent, or Firm* — JCIPRNET

(57) ABSTRACT

A method for transceiving signals and a transceiver using the same are provided. The method includes: configuring a transmitting circuit to transmit a transmitting signal via a first transmitting channel of the transmitting circuit during a transmitting period of the transmitting signal; configuring a switch module to connect the first transmitting channel to a first transducer element of a probe during the transmitting period; and configuring the switch module to disconnect the first transmitting channel form the first transducer element and to connect the first transmitting channel to a second transducer element of the probe during the transmitting period.

10 Claims, 6 Drawing Sheets

METHOD FOR TRANSCEIVING SIGNALS AND TRANSCEIVER USING THE SAME

CROSS-REFERENCE TO RELATED APPLICATION

This is a continuation-in-part application of and claims the priority benefit of U.S. application Ser. No. 15/347,798, filed on Nov. 10, 2016, now pending. The entirety of the above-mentioned patent application is hereby incorporated by reference herein and made a part of this specification.

BACKGROUND

Technical Field

The disclosure relates to a method for transceiving signals and a transceiver using the same method.

Description of Related Art

A transceiver such as an ultrasound apparatus may have a plurality of transducer elements. The transducer elements may be used to form, for example, an ultrasound plane wave or a directional beam. A traditional transceiver transmits (or receives) a signal by a fixed set of transducer elements for one firing including transmit and receive. That is, the field pattern of said signal cannot be changed with time by configuring the transceiver during one firing.

SUMMARY

The disclosure is directed to a method for transceiving signals and a transceiver using the same method.

An embodiment of the disclosure provides a transceiver. The transceiver includes a probe, a switch module, a transmitting circuit, and a processor. The probe includes a first transducer element and a second transducer element. The switch module coupled to the probe. The transmitting circuit coupled to the switch module, wherein the transmitting circuit includes a first transmitting channel. The processor coupled to the transmitting circuit and the switch module, wherein the processor is configured to: configure the transmitting circuit to transmit a transmitting signal via the first transmitting channel during a transmitting period of the transmitting signal; configure the switch module to connect the first transmitting channel to the first transducer element during the transmitting period; and configure the switch module to disconnect the first transmitting channel from the first transducer element and to connect the first transmitting channel to the second transducer element during the transmitting period.

In an embodiment of the disclosure, the probe further includes a third transducer element and a fourth transducer element, wherein the transceiver further including a receiving circuit. The receiving circuit coupled to the switch module and the processor, wherein the receiving circuit includes a first receiving channel, wherein the processor is further configured to: configure the receiving circuit to receive a receiving signal via the first receiving channel during a receiving period of the receiving signal; configure the switch module to connect the first receiving channel to the third transducer element during the receiving period; and configure the switch module to disconnect the first receiving channel from the third transducer element and to connect the first receiving channel to the fourth transducer element during the receiving period.

In an embodiment of the disclosure, the receiving period is after the transmitting period.

In an embodiment of the disclosure, the receiving signal is an echo of the transmitting signal.

In an embodiment of the disclosure, a transducer element of the probe connects to one of a single transmitting channel of the transmitting circuit or a single receiving channel of the receiving circuit at a time.

An embodiment of the disclosure provides a method for transceiving signals. The method includes: configuring a transmitting circuit to transmit a transmitting signal via a first transmitting channel of the transmitting circuit during a transmitting period of the transmitting signal; configuring a switch module to connect the first transmitting channel to a first transducer element of a probe during the transmitting period; and configuring the switch module to disconnect the first transmitting channel form the first transducer element and to connect the first transmitting channel to a second transducer element of the probe during the transmitting period.

In an embodiment of the disclosure, the method further including: configuring a receiving circuit to receive a receiving signal via the a first receiving channel of the receiving circuit during a receiving period of the receiving signal; configuring the switch module to connect the first receiving channel to a third transducer element of the probe during the receiving period; and configuring the switch module to disconnect the first receiving channel from the third transducer element and to connect the first receiving channel to a fourth transducer element of the probe during the receiving period.

In an embodiment of the disclosure, the receiving period is after the transmitting period.

In an embodiment of the disclosure, the receiving signal is an echo of the transmitting signal.

In an embodiment of the disclosure, a transducer element of the probe connects to one of a single transmitting channel of the transmitting circuit or a single receiving channel of the receiving circuit at a time.

According to the above description, the transceiver of the present discourse may disconnect a channel from a transducer element and connect the channel to another transducer element during a period which a signal is being transmitting or receiving. Therefore, a field pattern corresponding to one signal transmission may be changed with time by configuring the transceiver.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
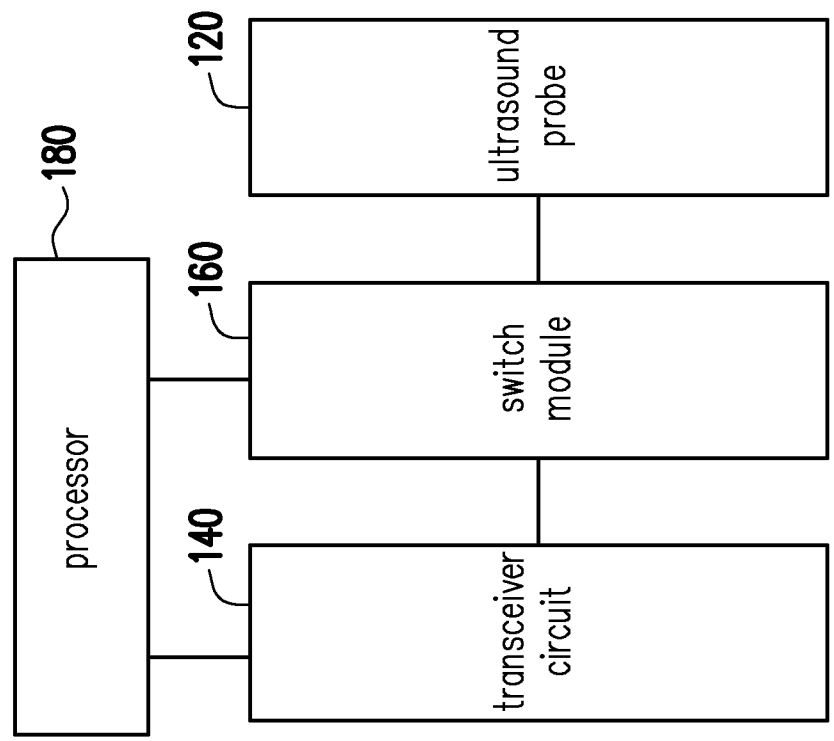
FIG. 1 is a block diagram illustrating an ultrasound apparatus according to an embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

FIG. 1 is a block diagram illustrating an ultrasound apparatus according to an embodiment of the present disclosure. Referring to FIG. 1, in the present embodiment of the present disclosure, the ultrasound apparatus 100 includes an ultrasound probe 120, a transceiver circuit 140, a switch module 160 and a processor 180. The switch module 160 is switched between the ultrasound probe 120 and the transceiver circuit 140. The processor 180 is connected to the switch module 160 and the transceiver circuit 140, and thereby controls the switch module 160 and the transceiver circuit 140 for the ultrasound emission and detection. In an embodiment of the disclosure, the ultrasound apparatus 100 may be implemented in an electronic apparatus with computation ability, such as a personal computer, a laptop computer, a tabular computer, a server and a smart device, but it is not limited herein.

Figure 2:
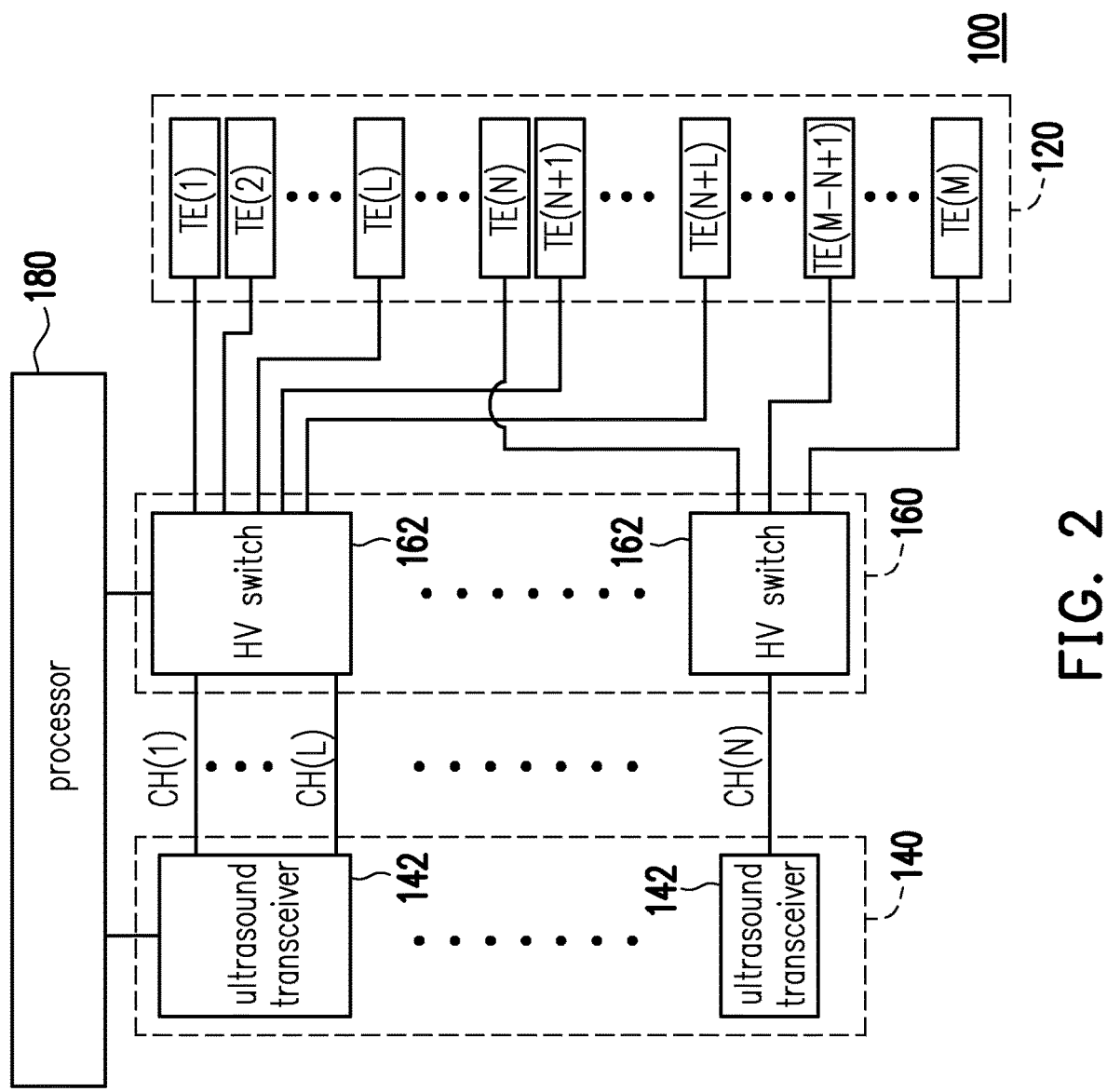
FIG. 2 is a detailed diagram illustrating an ultrasound apparatus according to an embodiment of the present disclosure.

In an embodiment of the present disclosure, the ultrasound probe 120 includes a plurality of transducer elements, which emits ultrasound waves and receives echoes of the ultrasound waves. FIG. 2 is a detailed diagram illustrating an ultrasound apparatus according to an embodiment of the present disclosure. Referring to FIG. 1 and FIG. 2, in the present embodiment, a 1st transducer elements to a Mth transducer elements TE(1)-TE(M) of the ultrasound probe 120 are arranged in a line, where M is a positive number, but the arrangement of the transducer elements TE(1)-TE(M) is not limited herein.

In the present embodiment, every two adjacent transducer elements, such as the transducer element TE(1) and the transducer element TE(2), are apart with a distance 1. The distance 1 is determined in accordance with the design of the ultrasound probe 120, and it could be several millimeters (mm) or less, though it is not limited herein. By respectively applying voltages (also called transmission signals) to the transducer elements TE(1)-TE(M), each of the transducer elements TE(1)-TE(M) is driven to output ultrasound beam, and those ultrasound beams are combined to form a wave traveling along a preferred direction.

After the emission of the ultrasound waves, the 1st transducer elements to the Mth transducer elements TE(1)-TE(M) of the ultrasound probe 120 are further configured to listen for echoes that are produced when the emitted ultrasound waves are reflected by objects. Reception signals are generated by the transducer elements TE(1)-TE(M) when detecting and receiving the echoes.

Referring to FIG. 1 and FIG. 2, in an embodiment of the present disclosure, the transceiver circuit 140 includes a plurality of ultrasound transceivers 142 and a 1st transceiving channel to a Nth transceiving channel CH(1)-CH(N), where N is a positive integer. In an embodiment, M may be a multiple of N. Each of the ultrasound transceivers 142 may provide several transceiving channels. In the present embodiment shown in FIG. 2, the ultrasound transceivers 142 are octal ultrasound transceivers which respectively provides 8 transceiving channels CH(1)-CH(8), . . . , CH(N−8)-CH(N). However, the embodiment is not intended to limit the number of the transceiving channels for each of the ultrasound transceivers 142. In other embodiments, the each of the ultrasound transceivers 142 may provide various number of the transceiving channels.

In the present embodiment, the 1st transceiving channel to the Nth transceiving channel CH(1)-CH(N) are responsible for generating and transmitting transmission signals to the ultrasound probe 120 under the control of the processor 180. The transmission signals are the voltage pulses that applied to the transducer elements TE(1)-TE(M) of the probe 120. Further, when receiving reception signals from the ultrasound probe 120 in response to the echoes of the ultrasound, the 1st transceiving channel to the Nth transceiving channel CH(1)-CH(N) may correspondingly transform the reception signals to Low-Voltage Differential Signaling (LVDS) signals, and then may send the LVDS signals to the processor 180.

Referring to FIG. 1 and FIG. 2, in an embodiment of the present disclosure, the switch module 160 includes at least one high voltage (HV) switch 162. In the embodiment, the high voltage switch 162 may be a multiplexer, however, the embodiment is not intended to limit the implement of the high voltage switch 162. Each high voltage switch 162 switches the connections between a portion of the transducer elements TE(1)-TE(M) and a portion of the transceiving channels CH(1)-CH(N) For example, the high voltage switch 162 switches the connection between the transducer elements TE(1)-TE(L), TE(N+1)-TE(N+L) and the transceiving channels CH(1)-CH(L), where L is a positive integer less than N.

Referring to FIG. 1 and FIG. 2, the processor 180 is a central processing unit (CPU), a programmable microprocessor, a digital signal processor (DSP), a programmable controller, an application specific integrated circuit (ASIC), a Field-programmable gate array (FPGA) or a programmable logic device (PLD), for example, but not limited thereto.

In an embodiment of the disclosure, the ultrasound apparatus 100, for example, further includes a storage unit (not shown) and an input/output (I/O) interface (not shown). The storage unit is, for example, a hard disk, a random access memory (RAM) or a similar device having a storage function for storing various messages, programs and data. The I/O interface of the ultrasound apparatus 100 is, for example, a universal serial bus (USB) port, a wireless communication device or a similar device having a communication function for communicating with other apparatuses and devices.

Figure 3:
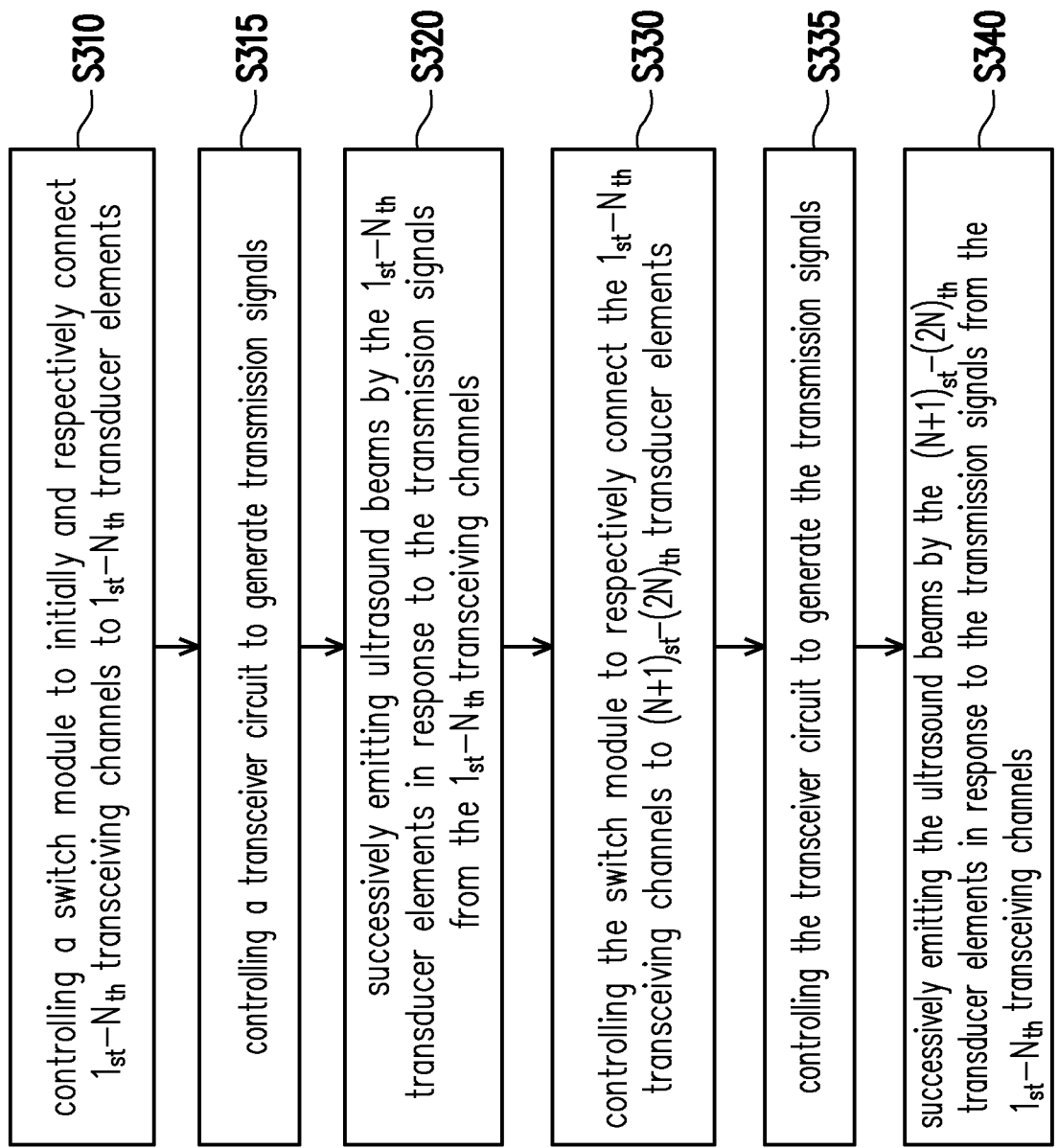
FIG. 3 is a flowchart illustrating an ultrasound emission method according to an embodiment of the present disclosure.

FIG. 3 is a flowchart illustrating an ultrasound emission method according to an embodiment of the present disclosure. In the present embodiment, the ultrasound emission method is, for example, adapted to the ultrasound apparatus 100 shown in FIG. 1 and FIG. 2. Referring to FIG. 1, FIG. 2, and FIG. 3, during a scanning period, the switch module 160 is controlled by the processor 180 to initially and respectively connect the 1st-Nth transceiving channels CH(1)-CH(N) to the 1st-Nth transducer elements TE(1)-TE(N) (step S310). After the 1st-Nth transceiving channels CH(1)-CH(N) are connected to the 1st-Nth transducer elements TE(1)-TE(N), the processor 180 controls the transceiver circuit 140 to generate transmission signals (step S315) by transmitting control signals to the transceiver circuit 140. The transmission signals are further sent to the ultrasound probe 120 from the 1st-Nth transceiving channels CH(1)-CH(N) of the transceiver circuit 140 through the switch module 160.

In response to the transmission signals from the 1st-Nth transceiving channels CH(1)-CH(N), the ultrasound beams are successively emitted by the 1st-Nth transducer elements TE(1)-TE(N) (step S320). It should be noted that, in an embodiment of the present disclosure, a time delay is adopted in successively emitting the ultrasound beams. In other words, every two of the ultrasound beams that are successively emitted, such as the ultrasound beams emitted by the 1st transducer element TE(1) and the 2nd transducer element TE(2), are separated in time by an interval.

Figure 4:
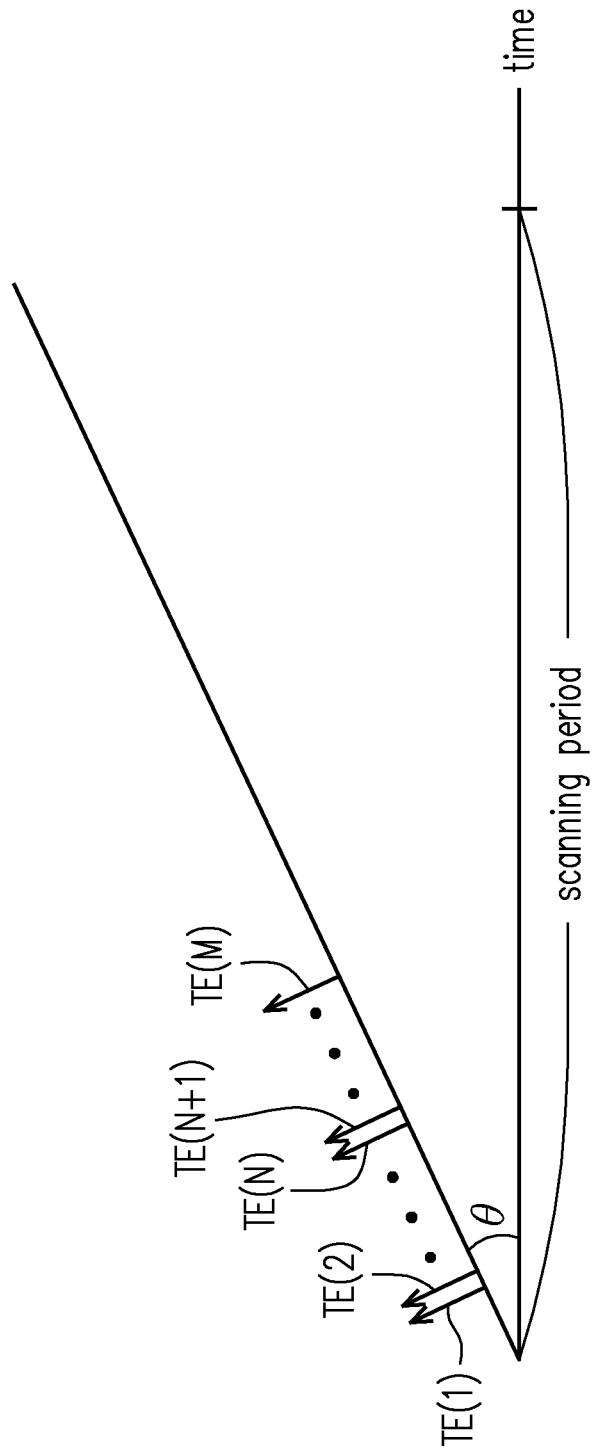
FIG. 4 is a schematic diagram of emitting a plane wave according to an embodiment of the present disclosure.

FIG. 4 is a schematic diagram of emitting a plane wave according to an embodiment of the present disclosure. Referring to FIG. 4, when every two adjacent transducer elements, such as the 1st transducer element TE(1) and the 2nd transducer element TE(2), are apart with a distance 1, for emitting the plane wave with an incident angle θ, the interval mentioned above is shown as below.

$$\text{interval}=1\times\sin\theta/V \quad (1)$$

It should be noted that, V is a velocity of ultrasound which is approximately 1540 meters per second (m/s). Thus, for example, the ultrasound beam emitted by the 2nd transducer element TE(2) is subsequent to the ultrasound beam emitted by the 1st transducer element TE(1) for one interval mentioned above in time.

Referring to FIG. 1 to FIG. 4, after the ultrasound beam is emitted by the Nth transducer element, during the scanning period, the switch module 160 is controlled by the processor 180 to respectively connect the 1st-Nth transceiving channels CH(1)-CH(N) to the (N+1)th-(2N)th transducer elements TE(N+1)-TE(2N) (step S330). Then, the processor 180 controls the transceiver circuit 140 to generate the transmission signals (step S335) by transmitting the control signals to the transceiver circuit 140. The transmission signals are further sent to the ultrasound probe 120 from the 1st-Nth transceiving channels CH(1)-CH(N) of the transceiver circuit 140 through the switch module 160, such that the ultrasound beams are successively emitted by the (N+1)th-(2N)th transducer elements TE(N+1)-TE(2N) (step S340) in response to the transmission signals from the 1st-Nth transceiving channels CH(1)-CH(N).

In an embodiment of the present disclosure, since the ultrasound beams that are successively emitted by the Nth transducer element TE(N) and the (N+1)th transducer element TE(N+1) are also separated in time by the interval mentioned above, operation of the switch module 160 for respectively connecting the 1st-Nth transceiving channels CH(1)-CH(N) to the (N+1)th-(2N)th transducer elements TE(N+1)-TE(2N) should be performed during the interval. In other words, the operation of the switch module 160 for respectively connecting the 1st-Nth transceiving channels CH(1)-CH(N) to the (N+1)th-(2N)th transducer elements TE(N+1)-TE(2N) should be completed before the emission of the ultrasound beam performed by the (N+1)th transducer element TE(N+1).

Through the ultrasound emission method illustrated above, during one single scanning period, the total number of the emitted ultrasound beams is at least twice of the number of the transceiving channels CH(1)-CH(N). Thus, energy of the emission is increased, and the SNR of the ultrasound plane wave has been raised.

In an embodiment of the present disclosure, when M equals to 2N as shown in FIG. 2, after the ultrasound beam is emitted by the (2N)th transducer element TE(2N), the processor 180 controls the switch module 160 to respectively connect the 1st-Nth transceiving channels CH(1)-CH(N) to the 1st-Nth transducer elements TE(1)-TE(N) for detecting echoes of the ultrasound beams in rest of the scanning period. When the echoes of the ultrasound beams are detected, the reception signals are generated by the 1st-Nth transducer elements TE(1)-TE(N) and transmitted to the 1st-Nth transceiving channels CH(1)-CH(N). The reception signals are further transferred to LVDS signals by the transceiver circuit 140, and the LVDS signals are then sent to the processor 180.

However, in another embodiment of the present disclosure, when M equals to 3N, the processor 180 controls switch module 160 to connect the 1st-Nth transceiving channels CH(1)-CH(N) to the 1st-Nth transducer elements, the (N+1)st-(2N)th transducer elements, and the (2N+1)st-(3N)th transducer elements in serial. After the ultrasound beam is emitted by the (3N)th transducer element, the processor 180 controls the switch module 160 to respectively connect the 1st-Nth transceiving channels CH(1)-CH(N) to the 1st-Nth transducer elements TE(1)-TE(N) for detecting echoes of the ultrasound beams in rest of the scanning period.

In the present disclosure, the numbers and the relationship of M and N may be varied. However, from the above description, the corresponding operation of the ultrasound apparatus 100 and the ultrasound emission method could still be deduced even when M and N are changed, so those are not illustrated herein.

A design of the ultrasound apparatus 100 in an embodiment of the present disclosure is provided below. In this embodiment, M is 128, N is 64, so the number of the transducer elements is twice of the number of the transceiving channels. Further, if the number of the high voltage switch 162 is 4, then L is 16. One single scanning period may be 200 microseconds (μs), and ultrasound emission performed by all the transducer elements TE(1)-TE(M) may only cost a few microseconds (μs). However, it should be noted that, the design of the ultrasound apparatus 100 may be varied in corresponding to the practical requirement on the ultrasound detection.

In summary, in the ultrasound apparatus and the ultrasound emission method, through the operation of the switch module, the total number of the emitted ultrasound beams during a single scanning period is at least more than the number of the transceiving channels. Thus, energy of the emission is increased, so the Signal-to-Noise Ratio (SNR) has been raised, such that the ultrasound detection is more precise and accurate, and the quality of the ultrasound image is also improved. Further, the total cycle time for a succeed scanning could be shortened, so as to lower the power consumption on ultrasound detection.

Figure 5:
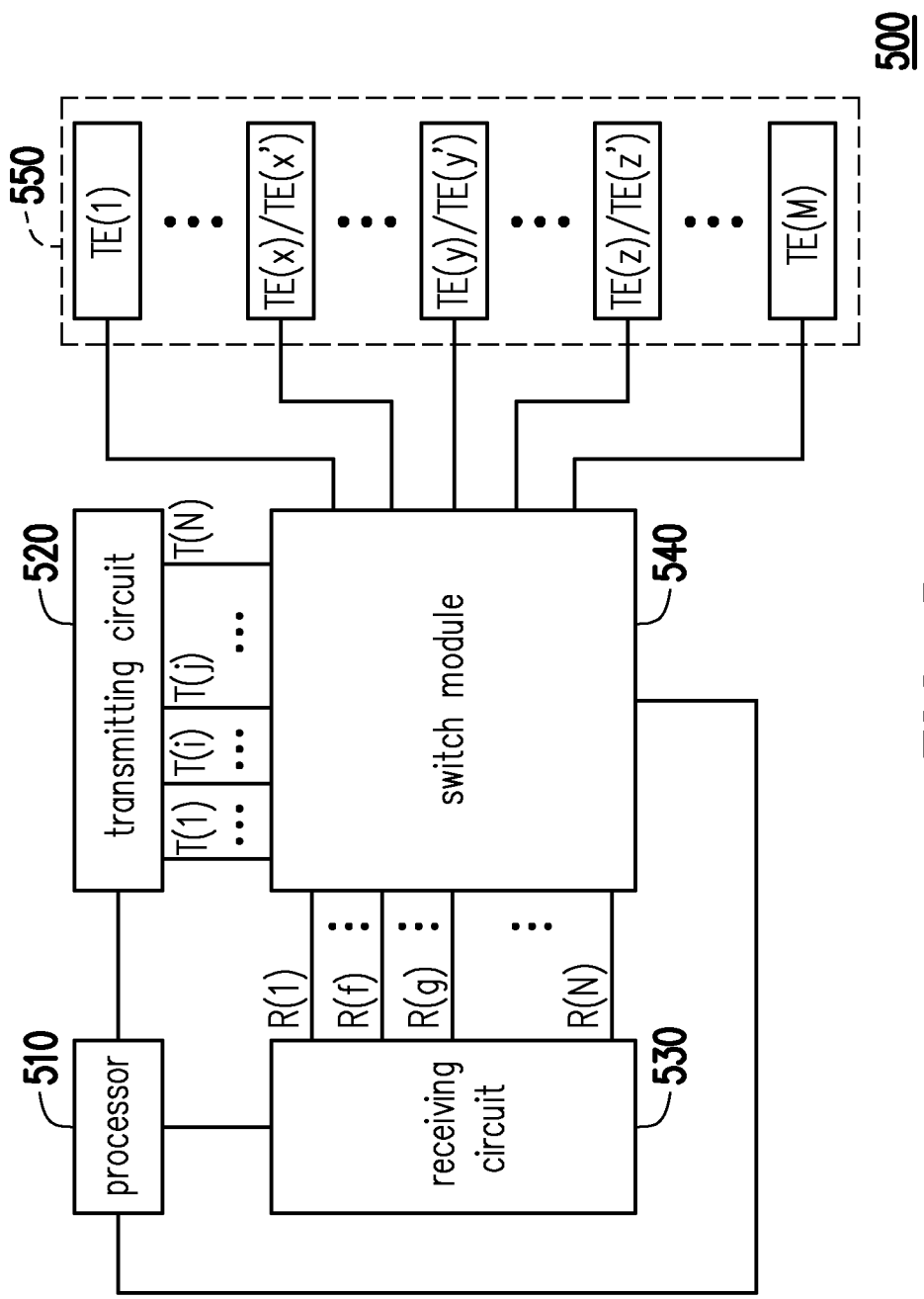
FIG. 5 is a schematic diagram illustrating a transceiver according to an embodiment of the present disclosure.

FIG. 5 is a schematic diagram illustrating a transceiver according to an embodiment of the present disclosure. The transceiver 500 may include a processor 510, a transmitting circuit 520, a receiving circuit 530, a switch module 540, and a probe 550. The transceiver 500 may be implemented in an electronic apparatus with computation or communication ability, such as a personal computer, a laptop computer, a tabular computer, a server, or a smart device, but the present disclosure is not limited thereto.

The processor 500 may be a CPU, a programmable microprocessor, a DSP, a programmable controller, an ASIC, a FPGA, or a PLD, but the present disclosure is not limited thereto.

The transmitting circuit 520 may be coupled to the processor 510 and the switch module 540. The transmitting circuit 520 may provide N transmitting channels for transmission of transmitting signals, wherein N is a positive integer, and the N transmitting channels may include 1st transmitting channel T(1), (i)th transmitting channel T(i), (j)th transmitting channel T(j), and (N)th transmitting channel T(N), as shown in FIG. 5. The transmitting circuit 520 may be controller by the processor 510 to generate a transmitting signal and to transmit the transmitting signal via a transmitting channel. In an embodiment, "i" or "j" mentioned above may be a positive integer from 1 to N.

The receiving circuit 530 may be coupled to the processor 510 and the switch module 540. The receiving circuit 530 may provide M receiving channels for transmission of receiving signals, wherein M is a positive integer, and the M receiving channels may include 1st receiving channel R(1), (f)th receiving channel R(f), (g)th receiving channel R(g), and (M)th receiving channel R(N), as shown in FIG. 5. The receiving circuit 530 may be controller by the processor 510 to receive a receiving signal via a receiving channel. In an embodiment, "f" or "g" mentioned above may be a positive integer from 1 to M.

The positive integer M as mentioned above may or may not equal to the positive integer N as mentioned above, the present disclosure is not limited thereto.

The switch module 540 may be coupled to the transmitting circuit 520, the receiving circuit 530, and the probe 550. In an embodiment, the switch module 540 may be a combination of one or more high voltage switches or a combination of one or more multiplexers, but the present disclosure is not limited thereto. The switch module 540 may be controller by the processor 510 to respectively connect one or more transmitting channels of the transmitting circuit 520 to one or more transducer elements of the probe 550, to respectively disconnect one or more transmitting channels of the transmitting circuit 520 from one or more transducer elements of the probe 550, to respectively connect one or more receiving channels of the receiving circuit 530 to one or more transducer elements of the probe 550, or to respectively disconnect one or more receiving channels of the receiving circuit 530 from one or more transducer elements of the probe 550.

The probe 550 may be coupled to the switch module 540. The probe 550 may include K transducer elements, wherein K is a positive integer, and each of the K transducer elements may be used for transmitting or receiving wireless signals. The K transducer elements may include 1st transducer element TE(1), (x)th transducer element TE(x), (y)th transducer element TE(y), (z)th transducer element TE(z), and (K)th transducer element TE(K), as shown in FIG. 5. K may be greater than or equal to N or M. In an embodiment, K may be multiple of N or multiple of M, but the present disclosure is not limited thereto. In an embodiment, K transducer elements may be arranged in a line, but the arrangement of K transducer elements is not limited thereto. In an embodiment, "x" or "y" or "z" mentioned above may be a positive integer from 1 to K.

The processor 510 may control the switch module 540 to connect the transmitting circuit 520 to the probe 550, so that the transmitting circuit 520 may transmit one or more transmitting signals to the probe 550. For example, during a first transmitting period of a first transmitting signal, the processor 510 may configure the transmitting circuit 520 to transmit the first transmitting signal via the transmitting channel T(i). The processor 510 may configure the switch module 540 to connect the transmitting channel T(i) to the transducer element TE(x) during the first transmitting period. After that, the processor 510 may configure the switch module 540 to disconnect the transmitting channel T(i) from the transducer element TE(x) and to connect the transmitting channel T(i) to the transducer element TE(y) during the first transmitting period.

In an embodiment, during a second transmitting period of a second transmitting signal, the processor 510 may configure the transmitting circuit 520 to transmit the second transmitting signal via the transmitting channel T(j), wherein the second transmitting signal may be the same or different from the first transmitting signal. The processor 510 may configure the switch module 540 to connect the transmitting channel T(j) to the transducer element TE(z) during the second transmitting period. The second transmitting period of the second transmitting signal may be overlapped, partially overlapped, or not overlapped with the first transmitting period of the transmitting signal.

The K transducer elements of the probe 550 may include (x')th transducer element TE(x'), (y')th transducer element TE(y'), (z')th transducer element TE(z'), as shown in FIG. 5. In an embodiment, "(x')" or "(y')" or "(z')" mentioned above may be a positive integer from 1 to K. The transducer elements TE(x'), TE(y'), and TE(z') may be the same or different from the transducer elements TE(x), TE(y), and TE(z) respectively.

The processor 510 may control the switch module 540 to connect the receiving circuit 530 to the probe 550, so that the receiving circuit 530 may receive one or more receiving signals from the probe 550. For example, during a first receiving period of a first receiving signal, the processor 510 may configure the receiving circuit 530 to receive the first receiving signal via the receiving channel R(f). The processor 510 may configure the switch module 540 to connect the receiving channel R(f) to the transducer element TE(x') during the first receiving period. After that, the processor 510 may configure the switch module 540 to disconnect the receiving channel R(f) from the transducer element TE(x') and to connect the receiving channel R(f) to the transducer element TE(y') during the first receiving period. In an embodiment, the first receiving period is after the first transmitting period. In an embodiment, the first receiving signal may be an echo of the first transmitting signal.

In an embodiment, during a second receiving period of a second receiving signal, the processor 510 may configure the receiving circuit 530 to receive the second receiving signal via the receiving channel R(g), wherein the second receiving signal may be the same or different from the first receiving signal. The processor 510 may configure the switch module 540 to connect the receiving channel R(g) to the transducer element TE(z') during the second receiving period. The second receiving period of the second receiving signal may be overlapped, partially overlapped, or not overlapped with the first receiving period of the first receiving signal.

In should be noted that, a transducer of the probe 550 may connect to a single transmitting channel of the transmitting circuit 520 (or a single receiving channel of the receiving circuit 530) at a time.

Figure 6:
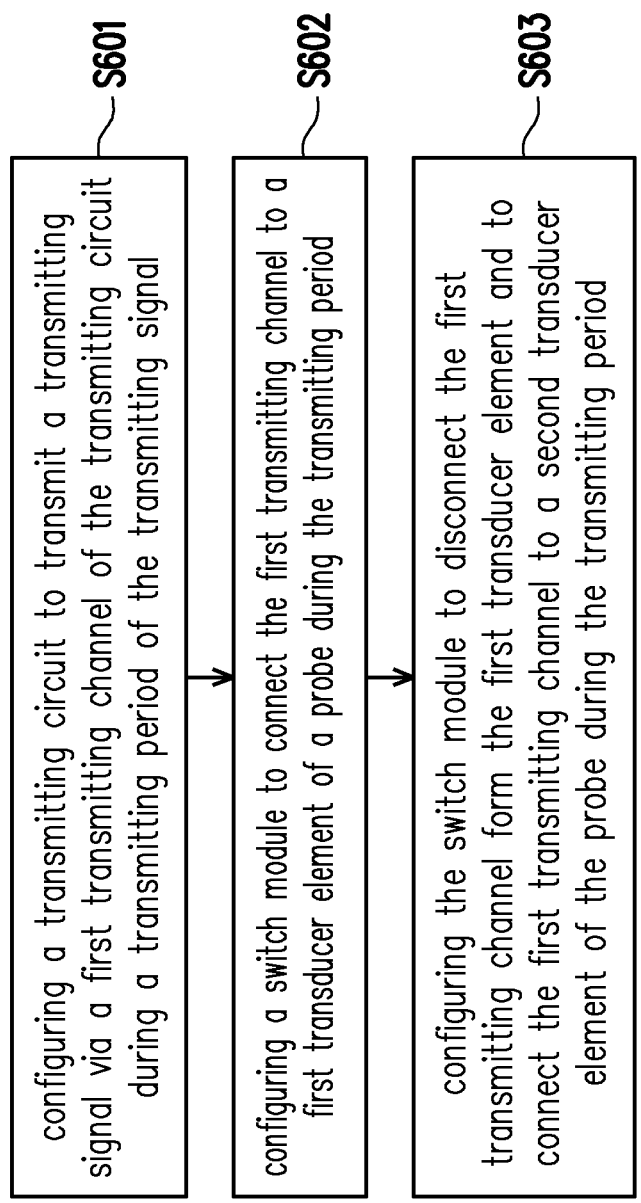
FIG. 6 is a flowchart illustrating a method for transceiving signals according to an embodiment of the present disclosure.

FIG. 6 is a flowchart illustrating a method for transceiving signals according to an embodiment of the present disclosure, wherein the method may be implemented by the transceiver 500 as shown in FIG. 5. In step S601, configuring a transmitting circuit to transmit a transmitting signal via a first transmitting channel of the transmitting circuit during a transmitting period of the transmitting signal. In step S602, configuring a switch module to connect the first transmitting channel to a first transducer element of a probe during the transmitting period. In step S603, configuring the switch module to disconnect the first transmitting channel form the first transducer element and to connect the first transmitting channel to a second transducer element of the probe during the transmitting period.

In summary, the transceiver of the present disclosure may disconnect a channel from a transducer element and connect the channel to another transducer element. Therefore, signal of said channel may be transmitted or received by different transducer elements, and spatial diversity of the signals may be increased.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A transceiver, comprising:
    a probe, comprising a first transducer element and a second transducer element;
    a switch module, coupled to the probe;
    a transmitting circuit, coupled to the switch module, wherein the transmitting circuit comprise a first transmitting channel; and
    a processor, coupled to the transmitting circuit and the switch module, wherein the processor is configured to:
    configure the transmitting circuit to transmit a transmitting signal via the first transmitting channel during a transmitting period of the transmitting signal;
    configure the switch module to connect the first transmitting channel to the first transducer element during the transmitting period; and
    configure the switch module to disconnect the first transmitting channel from the first transducer element and to connect the first transmitting channel to the second transducer element during the transmitting period.

2. The transceiver of claim 1, wherein the probe further comprises a third transducer element and a fourth transducer element, wherein the transceiver further comprising:
    a receiving circuit, coupled to the switch module and the processor, wherein the receiving circuit comprises a first receiving channel, wherein the processor is further configured to:
    configure the receiving circuit to receive a receiving signal via the first receiving channel during a receiving period of the receiving signal;
    configure the switch module to connect the first receiving channel to the third transducer element during the receiving period; and
    configure the switch module to disconnect the first receiving channel from the third transducer element and to connect the first receiving channel to the fourth transducer element during the receiving period.

3. The transceiver of claim 2, wherein the receiving period is after the transmitting period.

4. The transceiver of claim 2, wherein the receiving signal is an echo of the transmitting signal.

5. The transceiver of claim 2, wherein a transducer element of the probe connects to one of a single transmitting channel of the transmitting circuit or a single receiving channel of the receiving circuit at a time.

6. A method for transceiving signals, comprising:
    configuring a transmitting circuit to transmit a transmitting signal via a first transmitting channel of the transmitting circuit during a transmitting period of the transmitting signal;
    configuring a switch module to connect the first transmitting channel to a first transducer element of a probe during the transmitting period; and
    configuring the switch module to disconnect the first transmitting channel form the first transducer element and to connect the first transmitting channel to a second transducer element of the probe during the transmitting period.

7. The method of claim 6, further comprising:
    configuring a receiving circuit to receive a receiving signal via the a first receiving channel of the receiving circuit during a receiving period of the receiving signal;
    configuring the switch module to connect the first receiving channel to a third transducer element of the probe during the receiving period; and
    configuring the switch module to disconnect the first receiving channel from the third transducer element and to connect the first receiving channel to a fourth transducer element of the probe during the receiving period.

8. The method of claim 7, wherein the receiving period is after the transmitting period.

9. The method of claim 7, wherein the receiving signal is an echo of the transmitting signal.

10. The method of claim 7, wherein a transducer element of the probe connects to one of a single transmitting channel of the transmitting circuit or a single receiving channel of the receiving circuit at a time.

* * * * *